United States Patent Office 3,663,486
Patented May 16, 1972

3,663,486
PHENOLIC RESIN COMPOSITIONS AND A METHOD FOR THE PREPARATION THEREOF
William A. Keutgen, Martinsville, N.J., assignor to Union Carbide Corporation, New York, N.Y.
No Drawing. Filed Nov. 10, 1969, Ser. No. 875,535
Int. Cl. C08g 5/20
U.S. Cl. 260—19
6 Claims

ABSTRACT OF THE DISCLOSURE

This invention relates to phenolic resin compositions, suitable for use in molding applications and to a method for the preparation thereof by adding a Group II metal hydroxide or oxide to a liquid phenolic novolac resin to form a solution and thereafter adding to this solution, with agitation, a monobasic acid and if desired a filler such as sand with the result that the sand is coated by the phenolic resin and a Group II metal salt is precipitated and dispersed throughout the resultant free-flowing composition.

---

This invention relates to phenolic resin compositions and to a method for the preparation thereof. More particularly, this invention relates to the preparation of phenolic resin compositions, suitable for use in shell molding applications, by adding a Group II metal hydroxide or oxide to a liquid phenolic novolac resin to form a solution and thereafter adding to this solution, with agitation, sand and a monobasic acid with the result that the sand is coated by the phenolic resin and the Group II metal hydroxide or oxide reacts with the monobasic acid to form a Group II metal salt—a lubricant—which precipitates out and is dispersed throughout the resultant, free-flowing composition which is commonly referred to as a shell molding, coated sand.

Phenolic resin compositions are widely used in the production of so-called "shell" molds which, in turn, are used in casting applications wherein metals and alloys are formed into articles conforming to the contour of the "shell" mold. As a general rule, the production of "shell" molds is carried out by depositing or as stated in the art, investing sand, which has been coated with a thermosetting phenolic novolac composition, onto a heated metal pattern, allowing the coated sand to conform to the contour of the metal pattern and thereafter thermosetting the phenolic resin, usually by the application of heat, as a consequence of which, the thermoset resin binds the sand particles together to form a self-sustaining article or shell mold conforming to the shape of the metal pattern.

In preparing phenolic novolac resin compositions, which are to be used for coating sand, it is customary and, in fact, necessary that lubricants such as calcium stearate be added thereto. The addition of a lubricant is necessary in order that sand, coated with these compositions, have dry flowability during the investment operation and good "mold release" properties to assist in the subsequent release of the cured shell mold from the hot metal pattern.

The addition of a lubricant, such as calcium stearate, to liquid phenolic novolac resins has presented problems, however, in that an undesirable thixotropic, non-pourable paste is formed, or a composition is formed from which the lubricant tends to separate out, particularly when the composition is allowed to stand, thus resulting in a non-uniform composition.

The present invention provides for phenolic novolac resin compositions, containing a lubricant, wherein the lubricant is uniformly distributed throughout the compositions. Consequently, these compositions can be used to produce coated sand, characterized by excellent "dry flowability" as explained, and the coated sand used to produce shell molds, characterized by excellent "mold release" properties. In addition, the present invention provides greater operating latitude, as will be explained subsequently, to foundry personnel who, in practice, actually coat the sand with phenolic resin compositions.

According to the present invention, a Group II metal hydroxide or oxide, or mixture thereof, is admixed with a phenolic resin to form a clear solution. To this solution is then added, with agitation, a monobasic acid with the result that the monobasic acid reacts with the Group II metal hydroxide or oxide to form a Group II metal salt— a lubricant—which precipitates out and is dispersed throughout the composition. When sand, in addition to the monobasic acid, is added to the phenolic resin, the sand is coated with the phenolic resin as previously pointed out.

The greater operating latitude afforded by the present invention becomes apparent from the following discussion. In practice, the resin supplier provides to a foundry, a liquid phenolic novolac resin devoid of the lubricant and curing agent such as hexamethylenetetramine. Personnel at the foundry then effect the addition, in a muller, of the necessary additives, such as a lubricant, sand and a curing agent to produce a foundry resin suitable for use in preparing "shell" molds. Prior to this invention, foundry personnel had to add a powdery, dusty lubricant, such as calcium stearate, to the muller and were plagued with all of the normal problems of handling a dusty, powdery material. In addition to the problems of handling dusty, powdery material, foundry personnel were also faced with the problem of significant losses of the lubricant through an air draft, which is customarily blown through the muller in order to remove undesirable volatiles.

The present invention eliminates problems of handling dusty, powdery material. This invention allows the resin supplier to forward, to the foundry, a solution of a Group II metal hydroxide or oxide in a liquid phenolic resin. Foundry personnel can charge this solution directly to a muller and add thereto a monobasic acid, which is neither dusty or powdery, to form, in situ, a Group II metal salt, without being concerned with problems of handling dusty, powdery material or of losing material through the air draft blown through the muller.

Suitable resins for purposes of this invention are liquid phenolic novolac resins which are condensation products, generally acid catalyzed, of a phenol and an aldehyde.

Condensates, referred to as "novolac resins" are usually prepared by condensing a phenol and an aldehyde in the presence of an acid such as oxalic acid, sulfuric acid and the like or in the presence of a metal salt of an acid such as zinc acetate; wherein the aldehyde is present in the reaction mixture in less than stoichiometric amounts. Novolac resins are generally fusible, brittle, grindable resins which can be converted to the infusible state by the addition thereto of a methylene-generating agent such as hexamethylenetetramine.

Illustrative of suitable phenols which can be condensed with an aldehyde to produce suitable phenol-aldehyde resins are the monohydric as well as the polyhydric phenols.

Among suitable monohydric phenols can be noted; phenol, and those phenols having the general formula:

Formula I

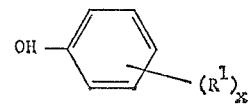

wherein $x$ is an integer having a value of 1 to 2 inclusive, each $R^1$, which can be the same or different, is an alkyl radical containing from 1 to 6 carbon atoms inclusive, an alkoxy radical containing from 1 to 6 carbon atoms inclusive, or a halogen, i.e., chlorine, bromine, iodine, and fluorine; with the proviso that at least three positions other than meta to the hydroxyl group are unsubstituted.

Specific phenols falling within the scope of Formula I are: alkylated phenols, exemplary of which are m-cresol, m-ethylphenol, m-propylphenol, m-isopropylphenol, m-sec butylphenol, m-amylphenol, m-n-hexylphenol, and other like phenols, as well as the commercially available meta-cresol which contains small amounts of both the para and the ortho isomers; alkoxylated phenols, exemplary of which are m-methoxyphenol, m-ethoxyphenol, m-propoxyphenol, m-n-hexoxyphenol, 3,5 - dimethoxyphenol, and the like: halogenated phenols such as meta-chlorophenol, meta-bromophenol, and the like. Also suitable are cycloalkenyl phenols such as p-cyclopentenyl phenol, p-cyclohexenylphenol and the like.

Among suitable polyhydric phenols can be noted resorcinol, and the like, as well as polyhydric, polynuclear phenols having the formula:

Formula II

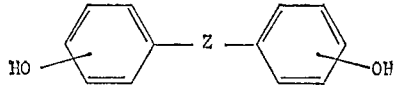

wherein Z is a divalent radical, as for example, sulfur, oxygen, alkylidene, alkylene and the like; as well as substituted derivatives of phenols falling within the scope of Formula II.

Exemplary of specific polyhydric, polynuclear phenols are the following: bis(hydroxyphenyl)alkanes such as 2,2-bis(4-hydroxyphenyl)propane, commonly referred to as bisphenol A, 2,4'-dihydroxydiphenylmethane and the like.

Examples of aldehydes which can be condensed with the phenols listed above to produce the phenol-aldehyde resins are: formaldehyde in any of its available forms, i.e., Formalin and para-formaldehyde; furfural and the like.

For a detailed discussion of condensates produced from a phenol and an aldehyde and methods for the production thereof, reference is made to the following: "Phenolic Resins" by W. A. Keutgen, Encyclopedia of Polymer Science & Technology, vol. 10, pps. 1–73, published by Interscience, John Wiley, 1969.

Examples of hydroxides and oxides of Group II metals, for example, beryllium, barium, cadmium, calcium, magnesium and zinc, suitable for purposes of this invention are the following: beryllium hydroxide, beryllium oxide, calcium hydroxide, calcium oxide, magnesium hydroxide, magnesium oxide and the like.

Illustrative of suitable monobasic acids which are useful for purposes of this invention are the saturated monobasic fatty acids having the formula:

Formula III

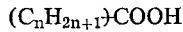

wherein $n$ is an integer having a value of 10 to 32 inclusive, preferably having a value of 15 to 20 inclusive. Specific acids falling within the scope of Formula III are the following: palmitic acid, stearic acid, arachidic acid, behenic acid, cerotic acid, psyllic acid, and the like.

Other suitable monobasic acids are the unsaturated monobasic fatty acids having the formula:

Formula IV

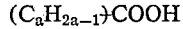

wherein $a$ is an integer having a value of 15 to 21 inclusive, preferably having a value of 17 to 21 inclusive. Specific acids, falling within the scope of Formula IV, are the following: oleic acid, elaidic acid, brassidic acid and the like.

Other suitable fatty acids are linoleic acid, linolinic acid and the like.

In formulating a solution of a Group II metal hydroxide or oxide in a liquid phenolic novolac resin, it is customary to add about 0.1 percent by weight to about 5 percent by weight and preferably about 0.5 percent by weight to about 3 percent by weight metal hydroxide or oxide to the liquid resin, based on the weight of the solids content of the resin.

The solids content of the liquid resin was determined according to the following procedure: A 1.5 gram sample of resin was heated in an oven, which was at a temperature of 135° C., for three hours. The residue was then cooled to room temperature, about 23° C., and weighed. The numerical weight of the residue was divided by the numerical weight of the sample and the result multiplied by 100. The result obtained indicated the percent weight, on a solids basis, of 1.5 grams liquid resin.

To this solution is then added about 50 percent of stoichiometric to about 100 percent in excess of stoichiometric of a monobasic acid, based on the amount of Group II metal hydroxide or oxide added. Optimum results are achieved using about a stoichiometric amount of a monobasic acid. For purposes of stoichiometric calculations, one molecule of a Group II metal hydroxide or oxide is deemed to react with one molecule of a monobasic acid.

Also, as stated, it is customary to add to the compositions a methylene-generating compound which will insure that the compositions, when heated, will thermoset to an infusible product. Illustrative of such methylene-generating compounds are hexamethylenetetramine, anhydroformaldehydeaniline, paraform and the like. A discussion of suitable methylene-generating compounds is to be found in the article by W. A. Keutgen, previously noted.

The methylene-generating compounds are employed in amounts of from about 5 percent by weight to about 25 percent by weight, preferably about 15 percent by weight based on the weight of the condensate of a phenol and an aldehyde. More than 25 percent by weight can be used but this is economically undesirable. (Weight basis—based on solids content of resin.)

When coating sand, the amount of phenolic resin used is about 1 percent to about 10 percent by weight and preferably about 2 percent to about 5 percent by weight based on the weight of the sand. (Weight basis—based on solids content of resin.)

Compositions of this invention can also contain various other additives, as are well known in the art. Illustrative of such additives are the so-called fillers which are inert materials usually added to phenolic resin compositions in order to improve the physical characteristics thereof. Illustrative of such fillers are the following: the mineral fillers such as asbestos, wollastonite, mica, silica, graphite, and the like; and organic fillers such as woodflour, cotton flock, polyamide fibers, polyester fibers, graphite cloth, graphite fibers and the like.

Fillers, when used, are generally employed in amounts of from about 1 percent by weight to about 30 percent by weight based on the weight of the phenolic resin (solids basis).

Other materials, commonly added to phenolic resin compositions, are iron, organic dyes such as nigrosine and the like.

The formulation of the compositions or foundry resins of this invention can be conveniently carried out by simply admixing a Group II metal hydroxide or oxide with a liquid novolac resin, at room temperature, to form a solution and thereafter adding to this solution, with agitation, a monobasic acid and sand, which has been heated preferably to a temperature of about 120° C. to about 170° C. A convenient vessel, in which to admix the sand and monobasic acid with the novolac resin solution, is a muller wherein suitable admixing of the materials can take place.

The following examples further illustrate the present invention.

EXAMPLE 1

A clear solution was formed by admixing 250 grams of a liquid phenol-formaldehyde novolac resin (75% solids) and 0.7 percent by weight, based on the solids content of the liquid resin, of calcium hydroxide. Two hundred twenty-seven grams of this resin solution were then poured into a laboratory Simpson muller containing twenty pounds of silica sand which had been preheated to a temperature of 300° F. After the addition of the resin solution, 9 grams of stearic acid were added to the contents of the muller and the resultant composition mulled for one minute. A solution of 90 grams of water and 40 grams of hexamethylenetetramine was added, and mulling was continued until the water had evaporated. Upon cooling, the sand was discharged from the muller as a coated, free-flowing sand indicating excellent dispersion of the precipitated calcium stearate.

EXAMPLE 2

Example 1 was repeated with the exception that no sand was used. Pressings made from the composition thus prepared showed uniform color characteristics, again indicating excellent dispersion of the precipitated calcium stearate.

The disclosure of all references noted in this application is incorporated herein by reference.

What is claimed is:

1. A method of producing a free flowing composition containing sand coated with a phenolic resin and in which a lubricant is produced in situ which comprises adding a Group II metal hyroxide or oxide to a liquid phenolic novolac resin to form a solution, adding to this solution, with agitation, sand and a monobasic fatty acid in an amount of about 50 percent of stoichiometric to about 100 percent in excess of stoichiometric, based upon the amount of Group II metal hydroxide or oxide added, wherein said monobasic fatty acid has the formula:

$$(C_nH_{2n+1})-COOH$$

wherein $n$ is an integer having a value of 10 to 32 inclusive, or wherein said monobasic fatty acid has the formula:

$$(C_aH_{2a-1})-COOH$$

wherein $a$ is an integer having a value of 15 to 21 inclusive, with the result that sand is coated by the phenolic resin and the said fatty acid reacts with the Group II metal hydroxide or oxide, to produce in situ a Group II metal salt lubricant which is dispersed throughout the resultant free-flowing composition.

2. A method as defined in claim 1 wherein said monobasic fatty acid is added in about a stoichiometric amount based upon the amount of Group II metal hydroxide or oxide added.

3. A method as defined in claim 1 wherein the Group II metal hydroxide is calcium hydroxide.

4. A method as defined in claim 1 wherein the Group II metal oxide is calcium oxide.

5. A method as defined in claim 1 wherein the monobasic acid is stearic acid.

6. A method as defined in claim 1 wherein the Group II metal hydroxide or oxide is used in amount of about 0.1 to about 5 percent by weight, based on the weight of the solids content of said resin.

References Cited

UNITED STATES PATENTS

| | | | |
|---|---|---|---|
| Re. 25,661 | 10/1964 | Less et al. | 260—19 |
| 1,571,447 | 2/1926 | Huxham | 260—19 |
| 1,985,200 | 12/1934 | Bonney et al. | 260—19 |
| 3,472,915 | 10/1969 | Rider | 260—19 |
| 2,186,687 | 1/1940 | Thompson et al. | 260—33.4 |
| 2,943,068 | 6/1960 | Freedman | 260—19 |

OTHER REFERENCES

"Handbook of Plastics" Simonds et al. 1949, pp. 405 and 413.

"Textbook of Organic Chemistry" Wertheim, 1956, p. 247.

DONALD E. CZAJA, Primary Examiner

W. E. PARKER, Assistant Examiner

U.S. Cl. X.R.

260—33.4, 38